(12) United States Patent
Gokavi et al.

(10) Patent No.: US 12,123,250 B2
(45) Date of Patent: Oct. 22, 2024

(54) FASTENERS

(71) Applicant: Illinois Tool Works Inc., Glenview, IL (US)

(72) Inventors: Mahantesh Gokavi, Pune (IN); Komali Bokka, Pune (IN); Priyabrata Gochhayat, Pune (IN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/215,295

(22) Filed: Jun. 28, 2023

(65) Prior Publication Data

US 2024/0003176 A1    Jan. 4, 2024

(30) Foreign Application Priority Data

Jul. 1, 2022   (IN) .............................. 202221038141

(51) Int. Cl.
*E05F 5/02*   (2006.01)
*F16B 21/08*  (2006.01)

(52) U.S. Cl.
CPC ............ *E05F 5/022* (2013.01); *F16B 21/086* (2013.01)

(58) Field of Classification Search
CPC ... E05F 5/02; E05F 5/022; E05F 5/025; F16B 21/086; E05Y 2201/212
USPC ......................................................... D8/382
See application file for complete search history.

(56) References Cited

U.S. PATENT DOCUMENTS

| | | | | |
|---|---|---|---|---|
| D390,776 S | * | 2/1998 | Ueno | D8/382 |
| 6,119,306 A | * | 9/2000 | Antonucci | E05F 5/022 |
| | | | | 24/297 |
| 6,507,976 B2 | * | 1/2003 | Ichimaru | F16B 21/075 |
| | | | | 248/188.4 |
| 6,857,166 B2 | * | 2/2005 | Nakagaki | E05F 5/022 |
| | | | | 403/282 |
| 7,114,217 B2 | * | 10/2006 | Matsuzawa | E05F 5/022 |
| | | | | 16/2.2 |

(Continued)

FOREIGN PATENT DOCUMENTS

| | | |
|---|---|---|
| JP | 1984052447 U | 4/1984 |
| JP | S5952447 U | 4/1984 |

(Continued)

OTHER PUBLICATIONS

Notice of Reasons for Rejection dated Feb. 13, 2024 (mailed Feb. 20, 2024) in Japanese Patent Application No. 2021-531020 (7 pages).

*Primary Examiner* — Jeffrey O'Brien

(74) *Attorney, Agent, or Firm* — McAndrews, Held & Malloy, Ltd.

(57) ABSTRACT

The present disclosure relates to a fastener. The fastener includes a head portion, a nose positioned longitudinally opposite to the head portion, and a central shank connecting the head portion and the nose, wherein the central shank extends along a central longitudinal axis of the fastener. The fastener includes at least two snaps connected to the central shank as being diametrically opposite to each other about the central shank, in which each of the at least two snaps is to flex towards and away from the central longitudinal axis of the central shank to create a first biasing force. Further, the fastener includes at least two lateral members connected to the central shank as being diametrically opposite to each other about the central shank.

9 Claims, 4 Drawing Sheets

(56) References Cited

U.S. PATENT DOCUMENTS

| | | | | |
|---|---|---|---|---|
| 7,566,081 B2 * | 7/2009 | Aoyama | F16B 21/086 | |
| | | | 296/1.03 | |
| 8,407,857 B2 * | 4/2013 | Sugiyama | F16F 1/371 | |
| | | | 267/141 | |
| 8,984,715 B2 * | 3/2015 | Kaji | E05F 5/025 | |
| | | | 267/141 | |
| 9,212,512 B2 * | 12/2015 | Nakasone | F16F 1/12 | |
| 9,410,354 B2 * | 8/2016 | Nakasone | F03G 1/10 | |
| 9,493,976 B2 * | 11/2016 | Hattori | F16F 9/38 | |
| 9,550,459 B2 * | 1/2017 | Kato | B60R 13/0206 | |
| D779,313 S * | 2/2017 | Ukai | E05F 5/022 | |
| | | | D8/382 | |
| D786,054 S * | 5/2017 | Kato | D8/382 | |
| 9,670,710 B2 * | 6/2017 | Kwak | F16F 1/44 | |
| D817,162 S * | 5/2018 | Kaji | F16B 21/086 | |
| | | | D8/382 | |
| 10,047,818 B2 * | 8/2018 | Nakasone | F16F 13/005 | |
| 10,150,444 B1 * | 12/2018 | Schwalm | E05F 5/02 | |
| 10,315,706 B2 * | 6/2019 | Meskin | E05F 5/022 | |
| 10,570,655 B2 * | 2/2020 | Nakasone | E05C 19/16 | |
| 10,774,864 B2 * | 9/2020 | Shinoda | B60R 13/0206 | |
| 11,066,863 B2 * | 7/2021 | de Marco | E05F 5/025 | |
| 11,421,462 B2 * | 8/2022 | Gardynik | E05F 5/022 | |
| 11,661,964 B2 * | 5/2023 | Arteta | B60R 13/0206 | |
| | | | 411/510 | |
| 11,933,347 B2 * | 3/2024 | Gokavi | F16B 5/0642 | |
| 2017/0292650 A1 | 10/2017 | Namou | | |
| 2019/0055769 A1 * | 2/2019 | Davis | B62D 25/12 | |
| 2022/0333421 A1 * | 10/2022 | Kwak | B60J 5/101 | |
| 2024/0141709 A1 * | 5/2024 | Miyamae | E05F 5/022 | |
| 2024/0183369 A1 * | 6/2024 | Kwon | B60N 3/026 | |

FOREIGN PATENT DOCUMENTS

| | | |
|---|---|---|
| JP | H07260655 A | 10/1995 |
| JP | 2000046709 A | 2/2000 |
| JP | 2001071192 A | 3/2001 |
| JP | 2010002290 A | 1/2010 |
| JP | 2011229359 A | 11/2011 |
| JP | 2018005489 A | 1/2018 |

* cited by examiner

FASTENERS

RELATED APPLICATION

The present application claims the benefit of Indian Patent Application No. 202221038141, filed Jul. 1, 2022 titled "Fasteners," the contents of which are hereby incorporated by reference.

BACKGROUND

Various types of fasteners are used for fastening objects. For example, in case of an instrument panel of a vehicle, fasteners may be used to fix together adjacent panels or to secure one or more objects, such as trims, on the panels. One such type of fastener is usable with holes of different types, sizes, and shapes, provided in the objects to be secured together. In other words, for such a fastener to fasten the objects, such as the trim to the panel, the objects are provided with a hole. The fastener is inserted through the holes in both the objects to fasten the two objects together.

SUMMARY

The present disclosure relates generally to fastener and, more specifically, a closure bumper assembly having a fastener, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

Figure 1A:
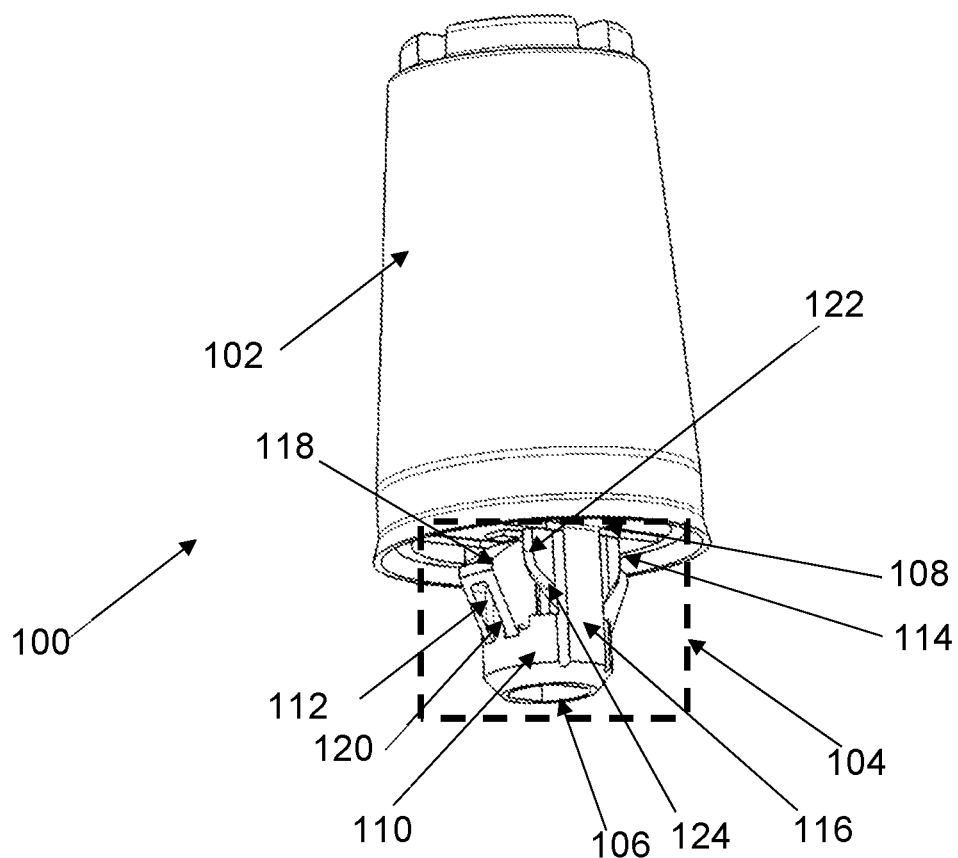
FIG. 1A illustrates an isometric view of a closure bumper assembly having a fastener, according to an example of the present subject matter.

Throughout the drawings, identical reference numbers designate similar, but not necessarily identical elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawing.

DETAILED DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

Fasteners used for coupling one object with another are widely used. In certain cases, both the objects to be coupled may each have a hole and both the objects may be positioned in a mounting position where the holes in the two objects may align. The fastener is, then, inserted through both the holes, thereby tying the two objects together. The objects may include, for example, insulator trims and a hood to be coupled, carpet trims, roof lining trims, plastic or rubber trims to be mounted on another object. In other cases, one component may be mounted to the fastener, the assembly referred to as a mounted fastener. The other component may have a hole which receives the mounted fastener, thereby coupling the two components.

In either of the two cases above, the fasteners may generally have a snap-fit design and may include an impact portion and a body portion. The body portion includes a shank which fits into the holes in the two objects to be coupled. The shank can have cantilevered arms having a snap-fit lock at their distal end away from the impact portion. The cantilevered arms may be biased to have a broader span than the hole into which the shank is fitted but yieldable such that the snap-fit lock can engage with the object(s). When the objects are to be secured together, the shank is inserted with force into the aligned holes in the objects. As the shank enters and slides through the holes, the cantilevered arms move slightly inwardly to allow insertion of the fastener, until the snap-fit locks on the arms engage with the object farther of the two, from the direction of insertion. Accordingly, when assembled, the objects may be sandwiched between the impact portion and the snap-fit lock on the shank of the fastener.

However, such fasteners may be limited in application. For instance, the fastener is designed for a particular size. For example, a fastener is made in two dimensions i.e., one to fit in an opening with dimensions of diameter ranging from 8.0 mm to 8.5 mm and the other opening with diameter 9.0 mm in a panel or frame of the vehicle. The fastener, therefore, designed for a particular sized opening, is not usable with any other size. In a scenario, where the fastener is designed to fit in a particular size opening is used and assembled in a different sized opening, an effective engagement may not be formed. Accordingly, it may not be possible to adequately fasten the fastener to the body panel/frame of the vehicle. At the same time, for assemblies which use multiple sizes of fastener, an inventory of all such differently sized fasteners has to be maintained. For instance, in the case of the fastener suitable for opening size diameter of 8.0 mm to 8.5 mm is inserted into the other opening of size diameter of 9.0 mm, the fastener may not completely fit into the opening size, thereby, leaving a play between the fastener and the opening, for the fastener to move with respect to the opening and cause noise or rattle. In addition, as a result, such fastener may also be subjected to wear due to the relative motion between the fastener and the opening in which it is disposed. Correspondingly, if the fastener suitable to fit in the opening of diameter 9.0 mm is inserted in the opening of smaller diameter ranging between 8.0 mm to 8.5 mm, the fastener may require considerably large force to be inserted and may even lead to damage to the fastener, further reducing its service life or, in certain cases, complete discarding of the fastener.

Further, when the fastener is inserted into the hole of the body panel/frame of the vehicle by the assembler, the assembler is unable to determine to whether the fastener is assembled into the frame/body panel of the vehicle. Therefore, in case of a novice assembler, there may be instances when the fastener is not adequately fixed or assembled but is considered so by the assembler. As a result, in such a scenario, the fastener may be inadequate in its function and may cause damage to the entire assembly that is used in.

In addition, such fasteners may be difficult to deploy owing to a high insertion force. Therefore, in few cases, instead of such fasteners, the component itself may be designed to have fastening capability to hold the component in its position. Once such component is a bump stopper that is installed in a frame or a body panel facing a vehicle closure, such as a hood, a tail gate, or a door of the vehicle, to prevent the vehicle closure from coming into direct contact with the frame or the body panel, when the vehicle closure is in a closed condition. Alternatively or additionally, the bump stopper may also be provided in the vehicle closure. In the absence of the bump stopper, during operation of the vehicle, the vehicle closure and the frame/body panel may come in contact with each other, rub, and adversely affect the noise-vibration-harshness (NVH) associated with the vehicle. The bump stopper is made of an elastic material, such as rubber, causing the vehicle closure to not move relative to the frame, while absorbing and reducing impact and the associated noises and vibrations due to any relative motion between the vehicle closure and the frame.

Conventionally, the bump stopper is a single piece which has a tail portion and an impact portion and may be made of an impact absorbing material, such as a rubber. The bump stopper prevents a vehicle closure, such as a hood, a tail gate, or a door of the vehicle, and the like, from coming into direct contact with a frame or a body panel of the vehicle, when the vehicle closure is in a closed condition. The bump stopper causes the vehicle closure to not move relative to the frame/body panel, while absorbing and reducing impact and the associated noises and vibrations due to any relative motion between the vehicle closure and the frame. The tail portion of the bump stopper is positioned inside openings of the frame/body panel of the vehicle. The impact portion of the bump stopper has a neck that is in the open and on a receiving end of an impact force. The impact portion of the bump stopper acts as a shock absorber to protect other components and the frame of the vehicle. The impact portion deforms when impact force is applied from the hood or the tail gate. The impact force is due to over-slamming of the hood and the tail gate at a high velocity, thereby generating a greater magnitude of force.

The tail portion of the bump stopper is, usually, slightly larger than a hole into which it is to be disposed during assembly. Accordingly, during assembly thereof to the body panel/frame or the vehicle closure, the tail portion of the bump stopper has to be inserted with force, for instance, by a combination of rotational and pushing movement by the assembler, be inserted into the hole to attach the bump stopper to the vehicle.

The process of assembling the bump stopper into the opening of the body panel/frame is a cumbersome process which requires the assembler to insert the bump stopper into the opening with force. As a result, the entire process of assembling the conventional bump stopper into the body panel/frame causes wear and tear on the bump stopper and causing the bump stopper to not be durable. Addition to the wear and tear caused at the time of assembly, in case the bump stopper faces the impact force regularly, the bump stopper may be damaged and may fail to deflect the impact force. The bump stopper is made of an impact absorbing material, such as elastic or rubber, which makes the impact portion of the bump stopper vulnerable to the elements of nature. The vulnerability of the impact portion of the bump stopper adversely affects the durability of the tail portion of the bump stopper, since the tail portion of the bump stopper is under most duress because of the impact force. As a result, the bump stopper may be damaged and may fail to deflect the impact force from the vehicle closures. Therefore, the conventional bump stopper, usually, may not have a long service life.

The present subject matter discloses examples and aspects to inter alia address the above-mentioned problems. The present subject matter, in one example, relates to a fastener which is designed to be durable, effective, and with a considerable service life, while having the flexibility to be used over a range of differently sized openings. The fastener of the present subject matter may be inserted through an opening, thereby tying two objects together. The objects may include, for example, insulator trims and a hood to be coupled, carpet trims, roof lining trims, plastic or rubber trims or components to be mounted on or coupled to another part, such as a vehicle body or panel or frame.

According to an example, the fastener may include a head portion and a nose longitudinally opposite to the head portion, the head portion and the nose connected by a central shank. The central shank may extend along a central longitudinal axis of the fastener. In other words, fastener can have the head portion and the central shank connected to the head portion. At the end opposite to that connected to the head portion, the central shank can have the nose, such that the head portion and the nose are on the two ends of the fastener. The nose of the fastener may be in the direction in which the fastener is inserted into the opening and the nose and the central shank, in general, may act as a locator and a guide, respectively for the fastener to be installed in the opening.

In one example, the fastener may include a plurality of components that help in installation of fastener in the opening and then effectively holding the fastener in the opening. Accordingly, as one example, the central shank may have at least two snaps. In an example, the at least two snaps are connected to the central shank as being diametrically opposite to each other about the central shank for locking the fastener with the part in which it is to be fixed.

In another example, each of the at least two snaps is to flex towards and away from the central longitudinal axis of the central shank.

In addition, in said example, the fastener can also have at least one flexible lateral extension, which are designed in the form of flexible wing-like structures that can flex and abut against a lateral wall of the opening and push against the lateral wall to hold the fastener in position with respect to the opening. At the same time, the at least one flexible lateral extension can also allow the fastener to be used over a range of sizes of the openings/holes, as is explained in detail later.

The at least two snaps can be formed as flexible, anchor-shaped limbs which can have a greater span across the central shank than the hole in which the fastener is to be installed. In one example, each of the at least two snaps have one end pivotally connected to the central shank and has another end that is a free end. Accordingly, as the central shank guides fastener into the opening, each of the at least two snaps may also get inserted into the opening. During the process of insertion, each of the at least two snaps may flex inwards towards the central shank i.e., towards the central longitudinal axis of the central shank, via the one end, causing the other end to flex inwards towards the central shank. In this example, the each of the at least two snaps may flex inwards towards the central shank i.e., towards the central longitudinal axis of the central shank, due to their greater span across the central shank. During assembly of the fastener, each of the at least two snaps may also flex towards the central longitudinal axis of the central shank during assembly of the fastener to allow insertion of the fastener. When the fastener is inserted completely into the opening through the nose and the central shank, each of the at least two snaps may flex outwards in the lateral direction away from the central shank. In this example, once the central shank is inserted into the opening, each of the at least two snaps may flex away from the central longitudinal axis of the central shank to create a first biasing force against the opening. The first biasing force may be a retention force by each of the at least two snaps against the lateral wall of the opening to lock the fastener in the opening. Each of the at least two snaps on flexing outwards may abut against the part in which the opening is formed, thereby locking the fastener in the opening and restricting the movement of the fastener. According to an example, the fastener may have at least two snaps that are, as mentioned above, diametrically opposite to each other. Additionally, according to an example, each of the at least two snaps when flexing outwards and abutting against the lateral wall of the opening may make a clicking sound, thereby, providing a confirmation of installation and locking of the fastener in the opening to the assembler. In this example, each of the at least two snaps are designed as requiring an insertion force that causes the at least two snaps to make the clicking sound when deployed by inserting into the opening. The insertion force being the force that pushes the at least two snaps to flex towards the central shank while being inserted into the opening, the first biasing force created caused the at least two snaps to make the clicking sound when deployed.

Further, the central shank can have at least two lateral members that may be diametrically opposite to each other about the central shank. In an example, each of the at least two lateral members may be positioned circumferentially offset with respect to the at least two snaps on the central shank.

In an example, each of the at least two lateral members may have at least one flexible lateral extension positioned in a direction parallel to an imaginary plane, that may be passing through the at least two snaps and the central shank. In an example, the at least one flexible lateral extension may have a first end and a second end. In this example, the first end may be a free end and the second end may be connected to one of the at least at least two lateral members. In an example, the second end of the at least one flexible lateral extension may be opposite to the first end. The at least one flexible lateral extension is provided on each of the at least two lateral members and extends in a direction parallel to the plane that is tangential to the central shank, for instance, in case the central shank is cylindrical. As mentioned previously, the at least one flexible lateral extension can be a wing-like structure provided on each of the at least lateral members such that they can flex towards and away from the imaginary plane that may be passing through the at least two snaps and the central shank. In an example, the at least one flexible lateral extension may have a curved profile and may have a gliding edge extending from the second end to the first end. The curved profile and the gliding edge of the at least one flexible lateral extension may allow the at least one flexible lateral extension to smoothly flex towards the imaginary plane while the fastener is being inserted and assembled into the opening. The curved profile and the gliding edge of the at least one flexible lateral extension may aid in easily inserting the fastener into the opening without additional force and pressure. The at least one flexible lateral extension may be hereinafter interchangeably referred to as the flexible lateral extension.

In another example, during the assembly of the fastener, as the central shank enters and slides through the opening, the flexible lateral extensions may also move slightly inwardly to allow the insertion of the fastener. For instance, the flexible lateral extension having the curved portion and the gliding edge, allows the flexible lateral extension to taper along the length of the fastener to allow easy insertion into the opening so that the edges of these the flexible lateral extension do not interfere with the edges of the lateral wall and do not block the entry of the fastener into the opening. Once the central shank is inserted into the opening, the flexible lateral extension may come in contact with the edge of the opening, and the curved portion and the gliding edge of the flexible lateral extension allow the flexible lateral extension to flex inwards towards the imaginary plane and the central shank. Further, even after the fastener is inserted sufficiently into the opening for each of the at least two snaps to engage, the flexible lateral extension may still keep abutting the lateral wall of the opening attempting to flex outwards, away from the central shank, thereby creating a second biasing force against the lateral wall of the opening that retains the fastener immovably in that position. The second biasing force may be a retention force by the flexible lateral extension against the lateral wall of the opening to lock the fastener in the opening. In other words, when the fastener is assembled and coupled, i.e., the head portion of the fastener is on one side of the opening and each of the at least two snaps are on the other side of the opening, the flexible lateral extension may lock the fastener in the opening through the second biasing force, thereby restricting movement. According to another example, the fastener may have at least two flexible lateral extension that may be positioned diametrically opposite to each other. However, other configurations which achieve the same result, are envisaged as part of the present subject matter. In addition, the installation of the fastener in the opening through components of the fastener helps in locking the fastener effectively and efficiently, without damaging the fastener.

According to an example, the provision of the flexible lateral extension can allow the same fastener to be used for a range of sizes of openings. Upon deployment of the fastener in the opening, the flexible lateral extension extends in the lateral direction to abut and create the second biasing force against the lateral wall of the opening to create retention against the opening. In this manner, the flexible lateral extension can adjust its span and be usable with different diameters of the openings, whilst creating sufficient retention through the second biasing force against the opening. In other words, the same fastener may be used with various sizes of openings. Therefore, the fastener may be installed in the opening of various sizes, thereby, avoiding any movement, loosening or rattling after installation.

Although, the aspects related to the techniques and designs as well as the present subject matter have been discussed in the context of fastener, it is to be understood that the fastener may be integrated to other types of components as well, such as a closure bumper assembly.

According to an example, the closure bumper assembly may be installed in an opening on the frame of the vehicle facing a vehicle closure, such as a hood and a tail gate of the vehicle. The opening on the frame may be to install the closure bumper assembly. The closure bumper assembly when installed may be able to prevent the vehicle closure from coming into direct contact with the frame of the vehicle when the vehicle closure is directly slammed on the frame of the vehicle. The closure bumper may have a bumper member that may absorb and reduce the impact force and vibrations.

The fastener may be integrated with the bumper member to form a closure bumper assembly. In certain cases, the fastener may be integrated, for example, by overmoulding with a component, i.e., in this case, a bumper member. In other cases, the fastener may be integrally fixed by joining to a component using adhesives. In certain other cases, the fastener may be detachably fixed to the bumper member.

The closure bumper assembly may be formed of two portions including a bumper member and a fastener portion. The fastener portion may be the fastener integrated with the bumper member forming a closure bumper assembly. According to an example, the fastener of the closure bumper assembly is positioned inside the openings of the frame structure of the vehicle. According to an example, the bumper member may be a part that may not be inserted into the frame of the vehicle and may be on the receiving end of the impact forces from the vehicle closures. The bumper member prevents the vehicle closure from coming into direct contact with the frame or the body panel when the vehicle closure is in a closed condition. The closure bumper assembly causes the vehicle closure to not move relative to the frame, while absorbing and reducing impact and the associated noises and vibrations due to any relative motion between the vehicle closure and the frame.

According to an aspect of the present subject matter, the fastener may be fabricated with plastic material and may have a head portion which may be integrated with the bumper member by either overmoulding or using adhesives. The components of the fastener as suggested above allows the fastener to be adequately fixed into an opening in the frame of the vehicle to attach the closure bumper assembly to the vehicle. According to an example, the bumper member of the closure bumper assembly may have multiple protrusions that may face the impact force directly. The multiple protrusions on the bumper member act as a shock absorber to protect other components and the frame of the vehicle and deform when an impact force is applied from the vehicle closure. The impact force is due to the over-slamming of the vehicle closure, such as a hood and a tailgate, at a high velocity, thereby generating a greater magnitude of force. According to an example, the bumper member may be made of an impact-absorbing material, such as an elastic or a rubber, and the like.

According to an example, the bumper member and the fastener may be two separate parts that may be combined to form the closure bumper assembly. According to an example, the bumper member and the fastener may be manufactured separately and may be integrated together to form a closure bumper assembly. In an instance, the bumper member may be overmolded on the head portion of the fastener. In another example, the fastener may be molded in a base area of the bumper member. In another example, the bumper member and the fastener may be manufactured separately and may be integrated using adhesives.

In view of the above, the closure bumper assembly may be easily fixed and locked on to a range of sizes of openings without requiring any substantial force, thereby avoiding any wearing and tearing of the closure bumper assembly. As a result, the productivity of the closure bumper assembly may improve since the closure bumper assembly may be locked on to the opening of the frame and there may be no movement affecting the productivity in assembly or causing any wear and tear to the closure bumper assembly.

The above aspects are further illustrated in the figures and described in the corresponding description below. It should be noted that the description and figures merely illustrate principles of the present subject matter. Therefore, various arrangements that encompass the principles of the present subject matter, although not explicitly described or shown herein, may be devised from the description and are included within its scope.

Figure 1B:
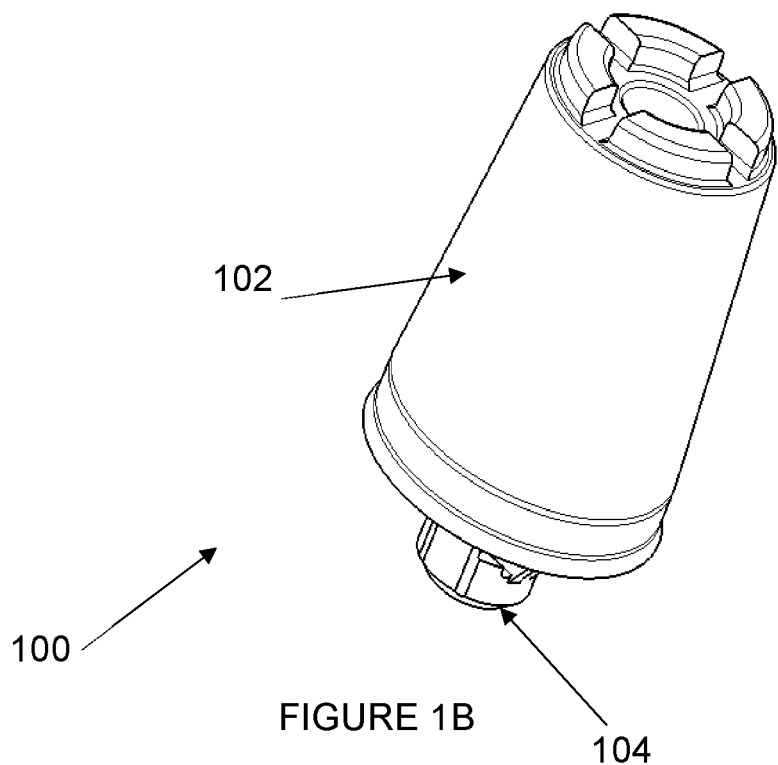
FIG. 1B illustrates another isometric view of the closure bumper assembly having a fastener, according to an example of the present subject matter.
Figure 1C:
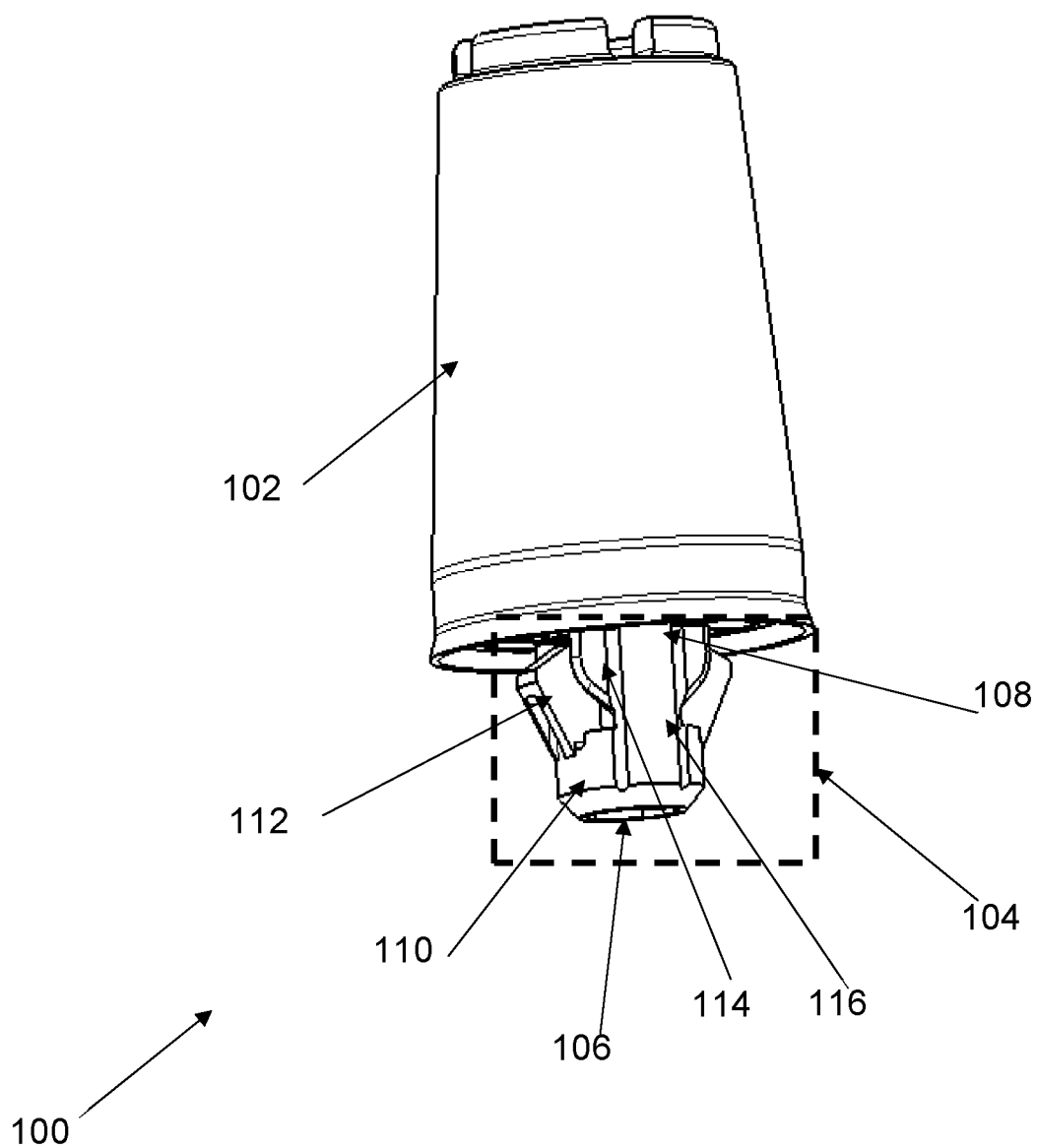
FIG. 1C illustrates yet another isometric view of the closure bumper assembly having a fastener, according to an example of the present subject matter.

FIG. 1A illustrates an isometric view of a closure bumper assembly 100 having a fastener 104, according to an example of the present subject matter. FIG. 1B illustrates another isometric view of the closure bumper assembly 100 having a fastener 104, according to an example of the present subject matter. FIG. 1C illustrates yet another isometric view of the closure bumper assembly 100 having a fastener 104, according to an example of the present subject matter. For the sake of brevity, FIGS. 1A-1C have been explained in conjunction with each other.

The closure bumper assembly 100 may be installed in an opening (not shown) in a body panel/frame (not shown) of a vehicle (not shown) facing a vehicle closure, such as a hood (not shown) and a tailgate (not shown) of the vehicle (not shown). The closure bumper assembly 100 may include a bumper member 102 and a fastener 104. The closure bumper assembly 100 may be positioned inside the openings of the frame structure (not shown) of the vehicle. The bumper member 102 of the closure bumper assembly 100 may prevent the vehicle closure from coming into direct contact with the frame or the body panel, when the vehicle closure is in a closed condition. The bumper member 102 may have a base area to connect with the fastener 104. The closure bumper assembly 100 causes the vehicle closure to not move relative to the frame, while absorbing and reducing impact and the associated noises and vibrations due to any relative motion between the vehicle closure and the frame.

According to an aspect, the bumper member 102 and the fastener 104 may be two separate parts that may be combined to form the closure bumper assembly 100.

According to an example, the fastener 104 may include a nose 106 and a head portion 108. The nose 106 may be longitudinally opposite to the head portion 108, the head portion 108 and the nose 106 may be connected by a central shank 110. In other words, fastener 104 can have a head portion 108 and the central shank 110 may be connected to the head portion 108. At the end opposite to that connected to the head portion 108, the shank can have the nose 106, such that the head portion 108 and the nose 106 are on the two ends of the fastener 104. The nose 106 of the fastener 104 may be in the direction in which the fastener 104 is inserted into the opening and the nose 106 and the central shank 110, in general, may act as a locator and a guide, respectively for the fastener 104 to be installed in the opening. The fastener 104 may include the central shank 110 which fits into the opening. In an example, the central shank 110 may extend along a central longitudinal axis (not shown) of the fastener 104.

According to an aspect of the present subject matter, the fastener 104 may be fabricated with plastic material. According to other example, the bumper member 102 may be made of an impact-absorbing material, such as an elastic or a rubber. According to an example, the head portion 108 of the fastener 104 may be integrated with the bumper member 102 by either overmoulding or using adhesives. According to an example, the bumper member 102 and the fastener 104 may be manufactured separately and may be integrated together to form a closure bumper assembly 100. In an instance, the bumper member 102 may be molded on the head portion 108 of the fastener 104. In another example, the fastener 104 may be molded in the base area of the bumper member 102. In another example, the bumper member 102 and the fastener 104 may be manufactured separately and may be integrated using adhesives.

According to an aspect, the bumper member 102 may be a part that may not be inserted into the frame of the vehicle and may be on the receiving end of the impact forces from the vehicle closures, such as such as a hood, a tailgate, or a door of the vehicle.

In another example, the fastener 104 may include components that help while installing the fastener 104 into the opening and then effectively holding the fastener 104 in the opening. The components may be one of the central shank 110, at least two snaps 112, and at least one flexible lateral extension 114. In another example, the fastener 104 may be any combination of the central shank 110, at least two snaps 112, and the at least one flexible lateral extension 114.

Accordingly, as one example, the at least two snaps 112 may be connected to the central shank 110 as being diametrically opposite to each other about the central shank 110 for locking the fastener 104 with the part in which it is to be fixed. In other words, the at least two snaps 112 of the fastener 104 may be tangentially opposite to each other on the central shank 110. In one example, each of the at least two snaps 112 has one end 118 and another end 120. In this example, the one end 118 may be pivotally connected to the central shank 110 and the other end 120 is a free end. In another example, each of the at least two snaps 112 is to flex towards and away from the central longitudinal axis of the central shank 110. According to another example, each of the at least two snaps 112 may be made of plastic.

In addition, in said example, the fastener 104 can also have the at least one flexible lateral extension 114, which is designed in the form of flexible wing-like structures that can flex and abut against a lateral wall of the opening and push against the lateral wall to hold the fastener 104 in position with respect to the opening. At the same time, the at least one flexible lateral extension 114 can also allow the fastener 104 to be used over a range of sizes of the openings/holes, as is explained in detail later. Further, the central shank 110 may have at least two lateral members 116 that may be diametrically opposite to each other about the central shank 110. In an example, each of the at least two lateral members 116 may be positioned circumferentially offset with respect to each of the at least two snaps 112. In an example, each of the at least two lateral members 116 may have at least one flexible lateral extension 114 positioned in a direction parallel to an imaginary plane (not shown), that may be passing through the at least two snaps 112 and the central shank 110. The at least one flexible lateral extension 114 is provided on each of the at least two lateral members 116 and extends in a direction parallel to the plane that is tangential to the central shank 110, for instance, in case the central shank 110 is cylindrical. As mentioned previously, the at least one flexible lateral extension 114 can be a wing-like structure provided on each of the at least two lateral members 116 such that they can flex towards and away from the imaginary plane, wherein the imaginary plane may be a plane that may be passing through the at least two snaps 112 and the central shank 110. In an example, the at least one flexible lateral extension 114 may have a first end 122 and a second end 124. In this example, the first end 122 may be a free end and the second end 124 may be connected to one of the at least two lateral members 116 through which the at least one flexible lateral extension 114 is connected. In an example, the second end 124 of the at least one flexible lateral extension 114 may be opposite to the first end 122.

In an example, the at least one flexible lateral extension 114 may have a curved profile and may have a gliding edge extending from the second end 124 to the first end 122, as illustrated in FIGS. 1A and 1C). The curved profile and the gliding edge of the at least one flexible lateral extension 114 may allow the at least one flexible lateral extension 114 to smoothly flex towards the imaginary plane while the fastener 104 is being inserted and assembled into the opening. The curved profile and the gliding edge of the at least one flexible lateral extension 114 may aid in the easy insertion of the fastener into the opening without additional force and extra effort. The at least one flexible lateral extension 114 may be hereinafter interchangeably referred to as the flexible lateral extension 114.

Figure 2A:
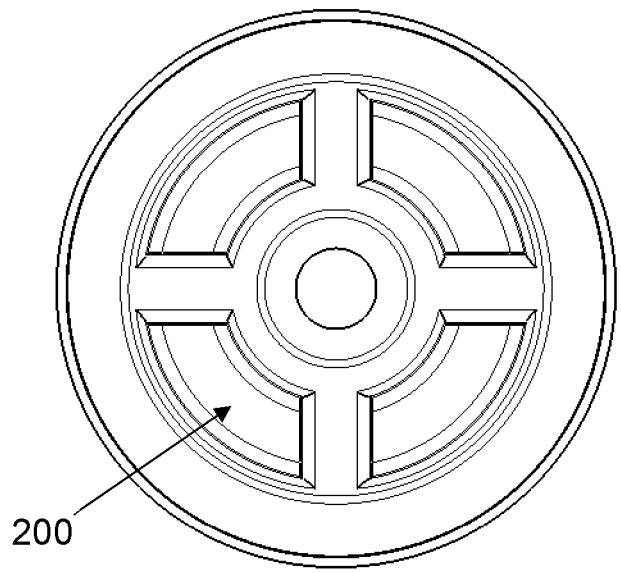
FIG. 2A illustrate a top view of the closure bumper assembly, according to an example of the present subject matter.
Figure 2B:
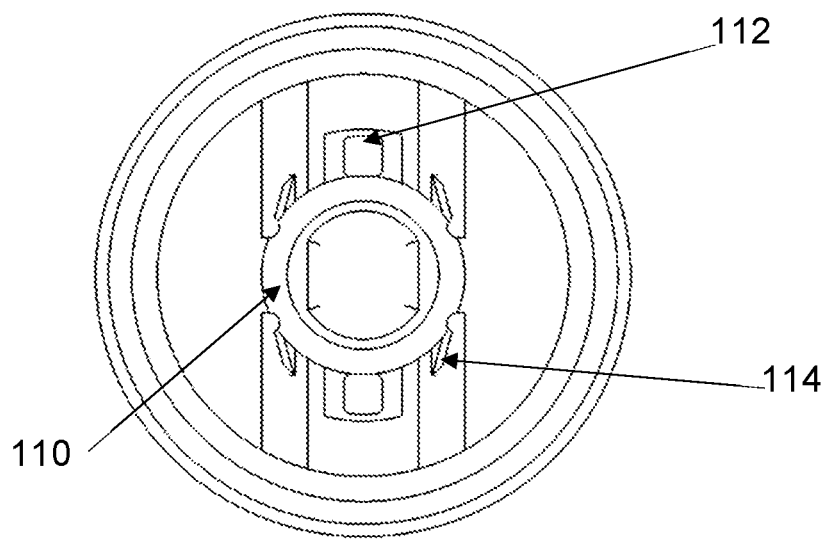
FIG. 2B illustrates a bottom view of the fastener, according to an example of the present subject matter.

FIG. 2A illustrates a top view of the closure bumper assembly 100, according to an example of the present subject matter. FIG. 2B illustrates a bottom view of the fastener 104, according to an example of the present subject matter. For the sake of brevity, FIGS. 2A and 2B have been explained in conjunction with each other.

According to an example, the bumper member 102 of the closure bumper assembly 100 may have multiple protrusions 200 that may face the impact force directly. The multiple protrusions 200 on the bumper member 102 may act as a shock absorber to protect other components and the frame of the vehicle and deforms when an impact force is applied from the vehicle closure. The impact force is due to over-slamming of the vehicle closure at a high velocity, thereby generating a greater magnitude of impact force.

According to another aspect, the central shank 110 acts as a guide for the fastener 104 of the closure bumper assembly 100 during the installation of the fastener 104 in the opening of the frame/body panel of the vehicle (not shown). According to an example, the fastener 104 may have at least two snaps 112 that are diametrically opposite to each other about the central shank 110 for locking the fastener 104 with the part in which it is to be fixed. Further, the central shank 110 may have at least two lateral members 116 that may be diametrically opposite to each other about the central shank 110, and circumferentially offset with respect to each of the at least two snaps 112.

Further, as the central shank 110 guides the fastener 104 (not shown) through the nose 106 into the opening (not shown), each of the at least two snaps 112 and the flexible lateral extension 114 of the fastener 104 may also move slightly inwardly to allow insertion of the fastener 104. During the process of insertion, the at least two snaps 112 and the flexible lateral extension 114 may flex inwards i.e., towards the central shank 110 of the fastener 104 (towards the central longitudinal axis of the plane). Further, as soon as the fastener 104 is inserted sufficiently into the opening for each of the at least two snaps 112 to engage, the flexible lateral extension 114 may still keep abutting the lateral wall of the opening attempting to flex outwards, away from the central shank 110. As a result, the fastener 104 gets completely locked into the opening, as is explained in detail later.

The locking of the fastener 104 in the opening helps to avoid any wear and tear and loosening of the closure bumper assembly 100 from the opening and as a result, the bumper member 102 may be able to deflect the impact force more efficiently.

Figure 3A:
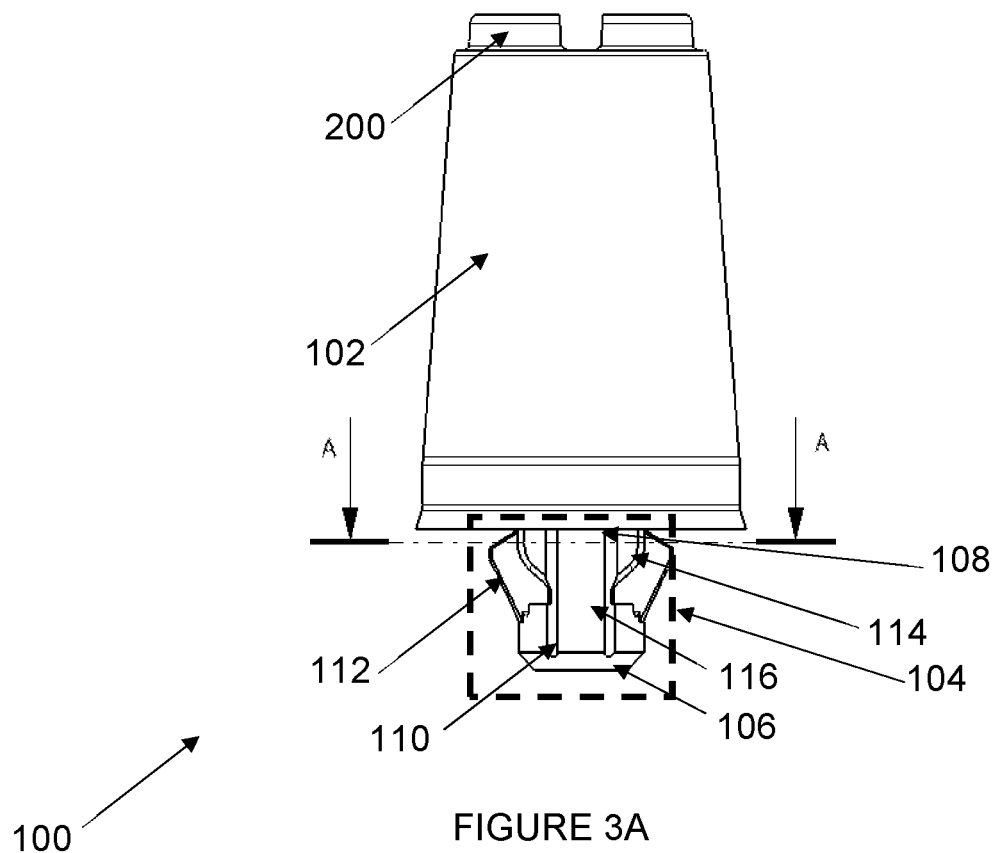
FIG. 3A illustrates a front view of the closure bumper assembly having the fastener, in accordance with an example of the present subject matter.
Figure 3B:
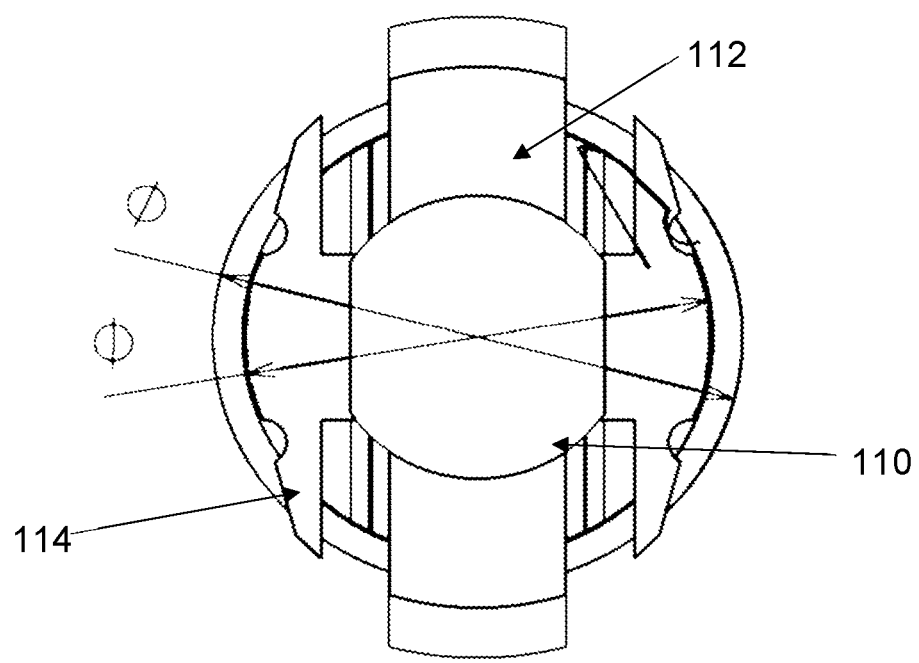
FIG. 3B illustrates a sectional bottom view of the closure bumper assembly having the fastener across sectional plane A-A shown in FIG. 3A, in accordance with an example of the present subject matter.

FIG. 3A illustrates a front view of the closure bumper assembly 100 having the fastener 104, in accordance with an example of the present subject matter. FIG. 3B illustrates a sectional bottom view of the closure bumper assembly 100 having the fastener 104 across sectional plane A-A shown in FIG. 3A, in accordance with an example of the present subject matter. For the sake of brevity, FIGS. 3A and 3B have been explained in conjunction with each other.

According to an example, the at least two snaps 112 may be formed as flexible, anchor-shaped limbs which can have a greater span across the central shank 110 than the hole in which the fastener 104 is to be installed. According to an example, when the fastener 104 of the closure bumper assembly 100 is inserted into the opening (not shown), each of the at least two snaps 112 may flex inwards towards the central shank 110 i.e., towards the central longitudinal axis of the central shank 110, via the one end 118, causing the other end 120 to flex inwards towards the central shank 110 to allow insertion of the fastener. In this example, the each of the at least two snaps 112 may flex inwards towards the central shank 110 i.e., towards the central longitudinal axis of the central shank 110, due to their greater span across the central shank 110.

In this example, once the central shank 110 of the fastener 104 is inserted into the opening, each of the at least two snaps 112 may flex away from the central longitudinal axis of the central shank 110 to create a first biasing force against the opening. The first biasing force may be a retention force by each of the at least two snaps 112 against the lateral wall of the opening to lock the fastener 104 in the opening. In other words, as soon as the fastener 104 is inserted completely into the opening, each of the at least two snaps 112 may flex outwards in the lateral direction tangential to the body of the fastener 104 to create the first biasing force against the lateral wall of the opening. Each of the at least two snaps 112 once extended, via the first biasing force, may abut against the frame of the opening, thereby locking the fastener 104 in the opening and thereby restricting the movement of the closure bumper assembly 100. Each of the at least two snaps 112 when abutting against the frame of the opening may make a clicking sound, thereby, providing a confirmation of installation and locking of the fastener 104 in the opening to an assembler. In this example, each of the at least two snaps is designed as requiring an insertion force that causes the at least two snaps to make a clicking sound when deployed by inserting into the opening.

During assembly of the fastener 104 of the closure bumper assembly 100, as the central shank 110 enters and slides through the opening, the flexible lateral extension 114 may also move slightly inwardly to allow insertion of the fastener 104. For instance, the flexible lateral extension 114, has been designed to have the curved portion and the gliding edge, thereby allowing the flexible lateral extension 114 to taper along the length of the fastener 104 to allow easy insertion into the opening so that the edges of the (wing-like structures) flexible lateral extension do not interfere with the edges of the lateral wall of the opening and do not block the entry of the fastener 104 into the opening. Once the central shank 110 is inserted into the opening, the flexible lateral extension 114 may come in contact with the edge of the opening and the curved portion, and the gliding edge of the flexible lateral extension 114 may allow the flexible lateral extension 114 to flex inwards towards the central longitudinal axis of the central shank 110. Further, even after the fastener 104 is inserted sufficiently into the opening for each of the at least two snaps 112 to engage, the flexible lateral extension 114 may still keep abutting the lateral wall of the opening attempting to flex outwards, away from the central shank 110, thereby creating a second biasing force against the lateral wall of the opening that retains the fastener 104 immovably in that position. The second biasing force may be a retention force by each of the flexible lateral extension 114 against the lateral wall of the opening to lock the fastener 104 in the opening In other words, when the fastener 104 is assembled and coupled, i.e., the head portion 108 of the fastener 104 is on one side of the opening and each of the at least two snaps 112 are on the other side of the opening, the flexible lateral extension 114 may lock the fastener 104 in the opening via the second biasing force, thereby restricting movement. According to another example, the fastener 104 may have at least two flexible lateral extension 114 that may be positioned diametrically opposite to each other. However, other configurations which achieve the same result, are envisaged as part of the present subject matter. In addition, the installation of fastener 104 in the opening through components of the fastener 104 helps in locking the fastener 104 effectively and efficiently, without damaging the closure bumper assembly 100.

According to an example, the fastener 104 of the closure bumper assembly 100 allows the same closure bumper assembly 100 to be used for a range of sizes of openings. The provision of the flexible lateral extension 114 may allow the same fastener 104 to be used for a range of sizes of openings. Upon deployment of the fastener 104 in the opening, the flexible lateral extension 114 extends in the lateral direction to create the second biasing force to abut against the lateral wall of the opening to create retention against the opening. In this manner, the flexible lateral extension 114 can adjust its span and be usable with different diameters of the openings, whilst creating sufficient retention or biasing force against the opening. In this example, the size of the openings may range between a diameter 8.0 mm to 9.0 mm. According to an example, the flexible lateral extension 114 of the fastener 104 extends in the lateral direction to abut against the lateral wall of the opening to create retention against the opening. In order to do that, the flexible lateral extension 114 adjusts the entire diameter of the fastener 104 according to the diameter of the opening, due to retention against the opening diameter. As a result, closure bumper assembly 100 having the fastener 104, is usable with a range of sizes of openings. In other words, the same closure bumper assembly 100 having the fastener 104 can be used with various sizes of the openings of the frames facing the vehicle closures.

While the foregoing description of figures is provided in the context of the closure bumper assembly 100 using the fastener 104, it is to be understood as a mere example of one of the applications of the fastener 104. The fastener 104 can be used as an independent component for the purposes of fastening various components as well as usable as an integrated or detachably fixed part with certain other components, as has been explained above in detail.

Although the present subject matter has been described with reference to specific embodiments, this description is not meant to be construed in a limiting sense. Various modifications of the disclosed embodiments, as well as alternate embodiments of the subject matter, will become apparent upon reference to the description of the subject matter.

What is claimed is:

1. A fastener comprising:
    a head portion;
    a nose positioned longitudinally opposite to the head portion;
    a central shank connecting the head portion and the nose, wherein the central shank extends along a central longitudinal axis of the fastener;
    at least two snaps connected to the central shank as being diametrically opposite to each other about the central shank, wherein each of the at least two snaps is configured to flex towards and away from the central longitudinal axis of the central shank to create a first biasing force in a first radial direction; and
    at least two lateral members connected to the central shank as being diametrically opposite to each other about the central shank, each of the at least two lateral members being positioned circumferentially offset to the at least two snaps on the central shank, wherein each of the at least two lateral members has at least one flexible lateral extension positioned in a direction parallel to an imaginary plane passing through the at least two snaps and the central shank, wherein the at least one flexible lateral extension is configured to flex towards and away from the imaginary plane to create a second biasing force in a second radial direction;
    wherein the at least two snaps are axially offset from the at least one flexible lateral extension of each of the at least two lateral members, such that after the at least two snaps are inserted through an opening so as to snap radially outward, the at least one flexible lateral extension of each of the at least two lateral members is configured to abut and flex radially outward against a lateral wall of the opening.

2. The fastener as claimed in claim 1, wherein each of the at least two snaps has one end pivotally connected to the central shank and has another end that is a free end.

3. The fastener as claimed in claim 1, wherein the at least one flexible lateral extension has a first end that is a free end and a second end connected to one of the at least two lateral members and is opposite to the first end, wherein the at least one flexible lateral extension has a gliding edge extending from the second end to the first end and formed as having a curved profile.

4. The fastener as claimed in claim 1, wherein each of the at least two snaps requires an insertion force that causes the at least two snaps to make a clicking sound when deployed by inserting into the opening.

5. The fastener as claimed in claim 1, wherein the fastener is fabricated with plastic material.

6. A closure bumper assembly comprising:
    a bumper member; and
    a fastener, wherein the fastener comprises:
        a head portion;
        a nose positioned longitudinally opposite to the head portion;
        a central shank connecting the head portion and the nose, wherein the central shank extends along a central longitudinal axis of the fastener;
        at least two snaps connected to the central shank as being diametrically opposite to each other about the central shank, wherein each of the at least two snaps is configured to flex towards and away from the central longitudinal axis of the central shank to create a first biasing force in a first radial direction; and
        at least two lateral members connected to the central shank as being diametrically opposite to each other about the central shank, each of the at least two lateral members being positioned circumferentially offset to the at least two snaps on the central shank, wherein each of the at least two lateral members has at least one flexible lateral extension positioned in a direction parallel to an imaginary plane passing through the at least two snaps and the central shank, wherein the at least one flexible lateral extension is configured to flex towards and away from the imaginary plane to create a second biasing force in a second radial direction;
        wherein the at least two snaps are axially offset from the at least one flexible lateral extension of each of the at least two lateral members, such that after the at least two snaps are inserted through an opening so as to snap radially outward, the at least one flexible lateral extension of each of the at least two lateral members is configured to abut and flex radially outward against a lateral wall of the opening.

7. The closure bumper assembly as claimed in claim 6, wherein the bumper member is overmolded on the head portion of the fastener.

8. The closure bumper assembly as claimed in claim 6, wherein the fastener is molded in a base area of the bumper member.

9. The closure bumper assembly as claimed in claim 6, wherein the bumper member and the fastener are integrated using adhesives.

* * * * *